April 24, 1951 C. McCARL 2,549,915
APPARATUS FOR MAKING FROZEN CONFECTIONS
Filed March 2, 1948
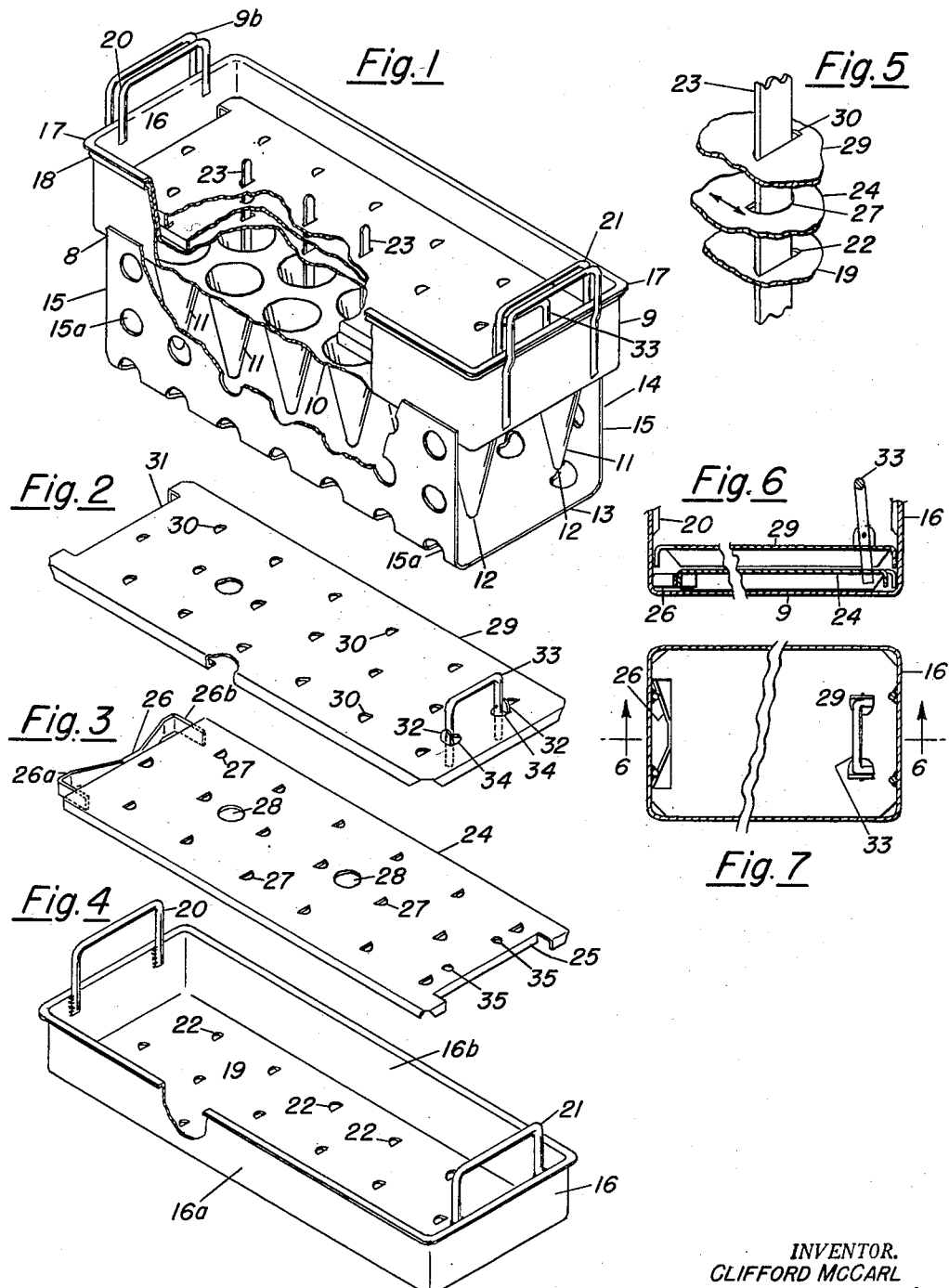
INVENTOR.
CLIFFORD McCARL
BY Everett A. Curtis
ATTORNEY Patented Apr. 24, 1951

2,549,915

UNITED STATES PATENT OFFICE 2,549,915

APPARATUS FOR MAKING FROZEN CONFECTIONS

Clifford McCarl, San Diego, Calif.

Application March 2, 1948, Serial No. 12,495

4 Claims. (Cl. 294—87)

My invention relates to apparatus for making frozen confections; and its objects are to provide a better means for shaping and freezing in convenient size and forms for human consumption fluid confections in which are embedded sticks for handling the same while the same is being consumed; to furnish a releasable means for holding a plurality of said sticks in upright position while being so embedded in a corresponding number of said confections as they are being molded and frozen, so that after such freezing has been accomplished they may be dipped simultaneously and covered with desired coatings, and thereupon released from the molds; to dispense with the necessity of seizing by hand the stick of each individual frozen confection and dipping the same individually in the coating mixture, and to produce uniformity of result in effecting such coatings; to provide a removable tray with floor plates and registrable openings therein for releasably gripping the sticks in cooperation with conventional apparatus for forming and freezing the confections in which said sticks are embedded; to construct a portable apparatus of the said character which is compact, economical of space, which is susceptible of immediate installation, or disconnection or removal as occasion requires, and which effects a great saving in time and labor; to render the parts of my apparatus readily accessible for inspection, adjustment, replacement, restoration or repair, and generally to provide an apparatus which is economical of construction, efficient in action and of prolonged life and durability. My invention further consists of other novel features of construction, and combinations and arrangements of parts, illustrated in the drawing and hereinafter more specifically described and claimed.

Attention is hereby directed to the accompanying drawing, illustrating a preferred form of my invention, in which similar numerals of designation refer to similar parts throughout the several views, and in which, Figure 1 is an isometric view of an attachment embodying my invention as used in connection with a conventional crib and bin for molding and freezing fluid confections, showing the removable tray with perforated floor plates releasably engaging the sticks, certain parts being shown cut away for the purpose of better illustration;

Fig. 2 is an isometric view of the perforated non-slidable upper floor plate of the tray, with pivotally mounted handle thereon;

Fig. 3 is a similar view of the perforated middle or intermediate sliding floor plate of the tray, with spring at end thereof;

Fig. 4 is an isometric view of the tray, showing perforations in the bottom thereof registrable with the perforations of said floor plates and the handles for lifting or installing the tray within the bin of the crib;

Fig. 5 is a fragmentary view of the shank of one of the sticks as held in registering perforations of the floor plates bottom of said tray;

Fig. 6 is a lateral cross section of the tray and floor plates thereof showing the same in operative relation for gripping or releasing the sticks, and showing the mechanism therefor, and Fig. 7 is a plan view of the tray shown in Fig. 6.

Referring to the drawing, the crib 8 is a conventional form of receptacle for shaping and molding ice cream or similar frozen confections, incorporating a bin 9 preferably rectangular in shape and of sheet metal and having a bottom 10 formed with a series of open conical molds 11, in upright position with their tapering ends 12 projecting downwardly. Preferably, welded or otherwise permanently secured to the side walls of said bin 9, and spaced from and enclosing the molds 11, is the rectangular shaped metallic shield 13, conforming with the shape of said bin, with open ends 14 and having its sides 15 provided with apertures 15a. Also, the general dimensions of the crib 8 are preferably such as are ordinarily required for installation in the usual brine tank employed for refrigerating stick confections.

As shown, the metallic tray 16 is in the form of a shallow rectangular box conforming to the lateral and linear interior dimensions of the bin 9, and is shaped to fit and to be seated within the hollow thereof with its outwardly bent rim 17 engaging with the outwardly bent rim 18 of said bin; so that the said tray is suspended from said rim 18 with its bottom 19 separated and spaced from the bottom 10 of said bin. At each end of said tray 16 are affixed the upwardly extending handles 20, 21, serving as a means for installing said tray within, or lifting the same out of, the said bin; and extending through the bottom of said tray are the perforations 22 shaped readily to receive and hold in upright position the shanks of the confection sticks 23, and located to be in substantial alignment with the axes of the molds 11 directly below.

These confection sticks 23, are not elements of the apparatus, but are separate and distinct therefrom, and as here shown are of the form of the narrow flat strips usually employed as means for handling and consuming frozen confections;

one end of said sticks being embedded in the confection with the other end protruding therefrom and serving as a handle for the convenient manipulation of the confection while the same is being eaten without requiring the touch of the human hands thereon.

Normally in close sliding contact with the bottom 19 of said tray is the intermediate metallic floor plate 24, the sides of which slidingly engage with the walls of the sides 16a and 16b of said tray, but which is in length made somewhat shorter than the interior length of said tray; one end of said plate 24 having the recess 25 therein, and the other end of said tray having secured thereto the flat spring 26, with free wings 26a and 26b engaging with the wall of the adjacent end of said tray and serving normally to keep the said plate 24 spaced therefrom with its recessed end in close contact with the opposite end wall of the tray. Perforations 27 through the plate 24, shaped, arranged and spaced like the perforations 22 in the bottom of said tray, are positioned so as to be movably registrable therewith. Openings 28 extending through the plate 24 provide fingerholds for lifting the same out of the tray or for installing said plate therein. Resting upon the plate 24, is the stationary upper floor plate 29 the ends and sides of which engage with the interior walls of the tray 16 and secure the said plate from horizontal movement therein. Perforations 30 through the plate 29, of the same shape and arrangement as those of the bottom of the tray, are positioned so as always to be in exact alignment therewith. One end of said plate 29, adjacent to the spring 26, is formed with the recess 31 therein, and at the other end of said plate is pivotally mounted upon ears 32 projecting upwardly therefrom, the inverted U-shaped handle 33, the vertical arms of which extend downwardly through openings 34 in the plate and engage with the openings 35 in the intermediate sliding floor plate 24, and serve to effect longitudinal movement thereof against the spring 26.

In installing the shanks of the confection sticks 23 so as to pass through the perforations of the bottom 19 of the tray 16 and floor plates 24 and 29 thereof, when assembled as shown in Fig. 1, and before said tray is introduced into the hollow of the bin 9, the U-shaped handle 33 is grasped by one hand of the workman together with the handle 21, and through manual compression of the two handles, is caused to move toward the adjacent end of the tray 16 so as to slide longitudinally the plate 24 against the spring 26 and to bring all of said perforations 22, 27 and 30 in alignment; at which time the said workman, using his other hand, carefully thrusts the shanks of said sticks 23 through said aligned openings in desired position, and when this is accomplished, releases his said compression of said handle 33, thereby causing the spring 26 to move the said plate back toward its normal position and to jam the shanks of said sticks so as to hold the same against displacement in upright position. Thereupon, ice cream or other fluid confection while in a semi-frozen condition is in any of the manners well understood in the art introduced into the conical molds 11, and the tray 16 inserted within the hollow of the bin 9 as shown in Fig. 1, with the downwardly protruding ends of the sticks 23 well immersed within the contents of the molds 11. Then the crib 8, carrying the bin 9, tray 16, with loaded contents as aforesaid, is placed in the brine tank, where the confection is frozen into a solid state, with the said sticks embedded therein. Thereafter the said crib is removed from said tank and plunged into warm water, with the result that the conical contents of the molds is loosened so that the tray 16 may readily be lifted out of the bin 9; the sticks 23 carrying and removing said molded contents therefrom to the place of discharge, which discharge is accomplished simply by compressing of handle 33 and bringing all of the said perforations 22, 27 and 30 in alignment and releasing said sticks to drop therefrom.

As shown in the drawing, the shanks of the sticks 23 are preferably flat strips of wood or other suitable material, and the perforations 22, 27 and 30 are preferably positioned so as to cause the said shanks when inserted therein to be substantially at right angles to the longer side of the rectangular tray 16; thereby causing the walls of the perforations 27 of the sliding plate 24 to effect a broad area of contact with the adjacent flat surfaces of said shanks, and insuring firm and efficient clamping of said shanks within said perforations upon the offsetting of said plate through manual compression of handles 21 and 30 as and for the purposes hereinbefore set forth. Preferably each of the perforations 22, 27 and 30 is made with a flat wall and a curved wall as shown in order that a better clamping grip may be secured of the sticks 23.

My invention may be embodied in other specific forms without departing from the spirit or essential characteristics thereof. The present embodiments, as above set forth are therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. In apparatus for making frozen confections on sticks embedded therein and protruding therefrom, the combination of, a tray having perforations in the bottom thereof formed to receive the shanks of confection sticks extending downwardly therefrom, a stationary floor plate and a floor plate slidable in relation thereto removably installed inside said tray and each having perforations therethrough conforming in size and arrangement to those in the bottom of said tray and permitting alignment therewith to receive the shanks of said sticks, and manually controlled spring actuated means for offsetting said sliding plate and releasably clamping the shanks of said sticks in upright position when installed in said perforations.

2. In apparatus for making frozen confections on sticks embedded therein and protruding therefrom, the combination of, a tray having perforations in the bottom thereof and shaped to receive the shanks of confection sticks downwardly extending downwardly therethrough, a horizontally immovable floor plate and a sliding floor plate slidable in relation thereto and the bottom of the tray and removably installed therein, and each plate having perforations therethrough conforming in size and arrangement to those in the bottom of said tray and permitting alignment therewith to receive the shanks of said sticks, and manually controlled spring actuated means connected with said plates for offsetting said perforations of sliding plate in relation to the other perforations and releasably clamping the shanks of said sticks extending therethrough.

3. In apparatus for making frozen confections on sticks embedded therein and protruding therefrom, the combination of, a tray having perforations in the bottom thereof shaped to receive the shanks of flat confection sticks extending downwardly therethrough; a stationary floor plate and a floor plate slidable in relation thereto, each plate being removably installable within said tray and each having perforations therethrough conforming in size and arrangement to those in the bottom of said tray and permitting alignment therewith to receive the shanks of said sticks, and manually controlled spring actuated means for clamping the flat sides of the shanks of said sticks in upright position when installed in said perforations.

4. In apparatus for making frozen confections on sticks embedded therein and protruding therefrom, the combination of, a rectangular tray having perforations in the bottom thereof shaped to receive the shanks of flat confection sticks extending downwardly therethrough and to cause them to be held substantially at right angles to the longer side of said tray; a stationary floor plate and a floor plate slidable in relation thereto longitudinally of said tray, each plate being removably installable within said tray and each having perforations therethrough conforming in size and arrangement to those in the bottom of said tray and permitting alignment therewith to receive the shanks of said sticks, and manually controlled spring actuated means for clamping the flat sides of the shanks of said sticks in upright position when installed in said perforations.

CLIFFORD McCARL.

REFERENCES CITED

The following references are of record in the file of this patent:

UNITED STATES PATENTS

| Number | Name | Date |
| --- | --- | --- |
| 281,777 | Millen | July 24, 1883 |
| 1,924,224 | West | Aug. 29, 1933 |
| 1,983,704 | Penrose et al. | Dec. 11, 1934 |
| 2,024,116 | Siemund | Dec. 10, 1935 |
| 2,131,446 | Lowenstein | Sept. 27, 1938 |
| 2,203,239 | Slee | June 4, 1940 |
| 2,232,196 | Anderson | Feb. 18, 1941 |
| 2,253,458 | Cutting | Aug. 19, 1941 |
| 2,257,160 | Cutting | Sept. 30, 1941 |
| 2,310,256 | Overland | Feb. 9, 1943 |